(12) United States Patent
Komaru et al.

(10) Patent No.: US 12,196,644 B2
(45) Date of Patent: Jan. 14, 2025

(54) WATERTIGHTNESS TESTING METHOD AND ASSEMBLING DEVICE

(71) Applicant: KUBOTA CORPORATION, Osaka (JP)

(72) Inventors: Yuito Komaru, Amagasaki (JP); Shozo Kishi, Amagasaki (JP); Masataka Shimomura, Amagasaki (JP); Daichi Higasa, Amagasaki (JP); Kohei Ikeda, Amagasaki (JP)

(73) Assignee: KUBOTA CORPORATION, Osaka Osaka (JP)

( * ) Notice: Subject to any disclaimer, the term of this patent is extended or adjusted under 35 U.S.C. 154(b) by 315 days.

(21) Appl. No.: 17/911,865

(22) PCT Filed: Mar. 15, 2021

(86) PCT No.: PCT/JP2021/010302
§ 371 (c)(1),
(2) Date: Sep. 15, 2022

(87) PCT Pub. No.: WO2021/187404
PCT Pub. Date: Sep. 23, 2021

(65) Prior Publication Data
US 2023/0139386 A1 May 4, 2023

(30) Foreign Application Priority Data
Mar. 16, 2020 (JP) .................................. 2020-044864

(51) Int. Cl.
*G01M 3/28* (2006.01)
*F16L 21/02* (2006.01)
(Continued)

(52) U.S. Cl.
CPC ........... *G01M 3/2853* (2013.01); *F16L 21/02* (2013.01); *F16L 25/10* (2013.01); *G01M 3/085* (2013.01); *F16L 2101/30* (2013.01)

(58) Field of Classification Search
CPC ...... G01M 3/2853; G01M 3/28; G01M 3/083; F16L 25/10; F16L 25/12; F16L 25/14;
(Continued)

(56) References Cited

U.S. PATENT DOCUMENTS 5,323,641 A * 6/1994 Tolliver .............. G01M 3/2853
73/49.1
2016/0290540 A1* 10/2016 Kishi ........................ F16L 1/09

FOREIGN PATENT DOCUMENTS

EP 3056783 A1 * 8/2016 ................ E03F 3/06
JP 2006084474 A * 3/2006
(Continued)

OTHER PUBLICATIONS

International Search Report from corresponding International Patent Application No. PCT/JP2021/010302 dated Jun. 1, 2021.
(Continued)

*Primary Examiner* — Herbert K Roberts
(74) *Attorney, Agent, or Firm* — KUSNER & JAFFE

(57) ABSTRACT

A watertightness testing method for testing watertightness of a joined section (4) where one end section of a second pipe (3) is joined to a first pipe (2), the watertightness testing method including: inserting a testing device body (21) into the first pipe (2); attaching an assembling device (80) to another end section of the second pipe (3); attaching a pulling device (82a) to the assembling device (80) and connecting the pulling device (82a) to a strap-shaped member (112a) having been wound in advance around an outer circumference of the first pipe (2); operating the pulling device (82a) and pulling the strap-shaped member (112a) in
(Continued)

a separating direction of the second pipe (3) to have a reaction force generated in the second pipe (3) cause the second pipe (3) to be pulled in a joining direction (G), the one end section of the second pipe (3) to be inserted into the first pipe (2), and the second pipe (3) to be joined to the first pipe (2); and operating a moving operation rod (22) provided in the testing device body (21) from outside of the other end section of the second pipe (3) in a state where the second pipe (3) is being pulled in the joining direction (G) to move the testing device body (21) to the joined section (4).

8 Claims, 16 Drawing Sheets

(51) Int. Cl.
  *F16L 25/10*   (2006.01)
  *G01M 3/04*    (2006.01)
  *G01M 3/08*    (2006.01)
  *F16L 101/30*  (2006.01)

(58) Field of Classification Search
  CPC ....... F16L 49/02; F16L 2101/30; F16L 55/26; F16L 55/265; F16L 55/28; F16L 55/30; F16L 55/32; F16L 55/34; F16L 55/36; F16L 55/38; F16L 55/40; F16L 55/46; F16L 55/48

See application file for complete search history.

(56) References Cited

FOREIGN PATENT DOCUMENTS

| JP | 2013040866 A | * | 2/2013 |
| JP | 2013120124 A | * | 6/2013 |
| JP | 2014157079 A | * | 8/2014 |
| JP | 2015099056 A | * | 5/2015 |
| JP | 2017-049241 A |   | 3/2017 |

OTHER PUBLICATIONS

Extended European Search Report issued in corresponding European Patent Application No. 21 771 069.8 dated Jul. 20, 2023.

* cited by examiner

WATERTIGHTNESS TESTING METHOD AND ASSEMBLING DEVICE

TECHNICAL FIELD

The present invention relates to a watertightness testing method of a joined section of pipes and to an assembling device used in the watertightness testing method.

BACKGROUND ART

Conventionally, examples of a watertightness testing method of this type include a method using a watertightness testing device 201 as shown in FIG. 16. Specifically, the watertightness testing device 201 includes a testing device body 205 which performs a watertightness test of a joined section 204 of pipes 202 and 203 inside the pipes 202 and 203 and a moving operation rod 206 for moving the testing device body 205 inside the pipes 202 and 203 in a pipe axial direction B.

The testing device body 205 includes a cylindrical member 207 and a pair of annular water stop bags 208 which are provided in the cylindrical member 207 and of which a diameter-expanding operation can be performed. An annular sealed space 209 enclosed by both water stop bags 208 of which a diameter-expanding operation has been performed to a water-stopping state, an outer circumferential surface of the cylindrical member 207, and inner circumferential surfaces of the pipes 202 and 203 is formed in the joined section 204.

The testing device body 205 inspects water leakage from an elastic seal 211 of the joined section 204 by supplying water 210 for a water pressure test to inside of the sealed space 209 and applying water pressure.

The moving operation rod 206 is attached to the cylindrical member 207 of the testing device body 205 and extends along the pipe axial direction B.

Accordingly, after joining a second pipe 203 to a first pipe 202, the moving operation rod 206 is operated to move the testing device body 205 to the joined section 204. Subsequently, diameters of both water stop bags 208 are expanded, the water 210 for a water pressure test is supplied to the inside of the sealed space 209, and water pressure is applied in order to inspect water leakage from the elastic seal 211 of the joined section 204.

Refer to Japanese Patent Laid-Open No. 2013-40866 for information on the watertightness testing device 201 described above.

SUMMARY OF INVENTION

Technical Problem

However, in the conventional form described above, when performing a watertightness test, there is a risk that the second pipe 203 may become pressed in a separating direction H by water pressure acting inside the annular sealed space 209 and that the second pipe 203 may become detached from the first pipe 202.

An object of the present invention is to provide a watertightness testing method and an assembling device capable of preventing a second pipe from becoming detached from a first pipe during a watertightness test.

Solution to Problem

A watertightness testing method according to the present invention for testing watertightness of a joined section where one end section of a second pipe is joined to a first pipe includes:

inserting, into the first pipe, a testing device body of a watertightness testing device for performing a watertightness test inside a pipe;

attaching an assembling device to another end section of the second pipe;

attaching a pulling device to the assembling device and connecting the pulling device to a strap-shaped member having been wound in advance around an outer circumference of the first pipe;

operating the pulling device and pulling the strap-shaped member in a separating direction of the second pipe to have a reaction force generated in the second pipe cause the second pipe to be pulled in a joining direction, the one end section of the second pipe to be inserted into an end section of the first pipe, and the one end section of the second pipe to be joined to the first pipe; and operating a moving operation rod provided in the testing device body from outside of the other end section of the second pipe in a state where the second pipe is being pulled in the joining direction to move the testing device body to the joined section inside the pipe and performing a watertightness test of the joined section.

Accordingly, since a watertightness test of a joined section is performed using the testing device body in a state where, after the second pipe is joined to the first pipe, the second pipe is being pulled in a joining direction, the second pipe is restrained by the first pipe via the assembling device, the pulling device, and the strap-shaped member in the pipe axial direction while the watertightness test is in progress. As a result, the second pipe can be prevented from becoming detached from the first pipe.

With the watertightness testing method according to the present invention, preferably, when operating the moving operation rod from outside of the other end section of the second pipe to move the testing device body to the joined section inside the pipe, the moving operation rod is passed through a passage space secured in a central part of the other end section of the second pipe and pulled outside from the other end section of the second pipe without interfering with the assembling device.

Accordingly, since the moving operation rod does not interfere with the assembling device when the moving operation rod is operated from outside of the other end section of the second pipe, the moving operation rod can be readily pulled outside from the other end section of the second pipe.

An assembling device used in the watertightness testing method according to the present invention includes:

a frame body attachable to and detachable from the other end section of the second pipe and an attaching section for attaching the pulling device to the frame body, wherein the attaching section is provided on the frame body, and the frame body can be attached to the other end section of the second pipe to be arranged in a periphery of the passage space for pulling out the moving operation rod.

Accordingly, the passage space is secured in the other end section of the second pipe in a state where the frame body is attached to the other end section of the second pipe. As a result, the moving operation rod is passed through the passage space and pulled outside from the other end section of the second pipe without interfering with the assembling device.

With the assembling device according to the present invention, preferably, the attaching section is provided outside in a pipe diameter direction of the frame body, a fall prevention device for preventing the frame body attached to the other end section of the second pipe from falling outward in the pipe diameter direction is provided on the frame body, and the fall prevention device has a rolling element that can be brought into contact with a wall surface surrounding the pipe.

Accordingly, by attaching the frame body of the assembling device to the other end section of the second pipe and attaching the pulling device to the attaching section of the frame body, the pulling device is arranged outside in the pipe diameter direction of the frame body.

When the strap-shaped member is pulled in the separating direction of the second pipe by operating the pulling device in this state, an outward external force in the pipe diameter direction acts on the frame body. However, due to the rolling element of the fall prevention device coming into contact with the wall surface against the external force, the frame body is supported on a side of the wall surface by the fall prevention device. Accordingly, the frame body can be prevented from falling outward in the pipe diameter direction.

In addition, when joining the second pipe to the first pipe, since the rolling element of the fall prevention device rolls in the joining direction while maintaining contact with the wall surface as the second pipe moves in the joining direction, the assembling device smoothly moves together with the second pipe in the joining direction.

With the assembling device according to the present invention, preferably, the fall prevention device has a position adjuster that moves a position of the rolling element in the pipe diameter direction.

Accordingly, by moving the position of the rolling element in the pipe diameter direction in accordance with a position of the wall surface, the rolling element can be reliably brought into contact with the wall surface.

Advantageous Effects of Invention

As described above, according to the present invention, a watertightness test of a joined section is performed using the testing device body in a state where, after joining the second pipe to the first pipe, the second pipe is being pulled in a joining direction. Therefore, while the watertightness test is in progress, the second pipe is restrained by the first pipe via the assembling device, the pulling device, and the strap-shaped member in the pipe axial direction. Accordingly, the second pipe can be prevented from becoming detached from the first pipe.

DESCRIPTION OF EMBODIMENTS

Hereinafter, embodiments of the present invention will be described with reference to the drawings.

First Embodiment

Figure 1:
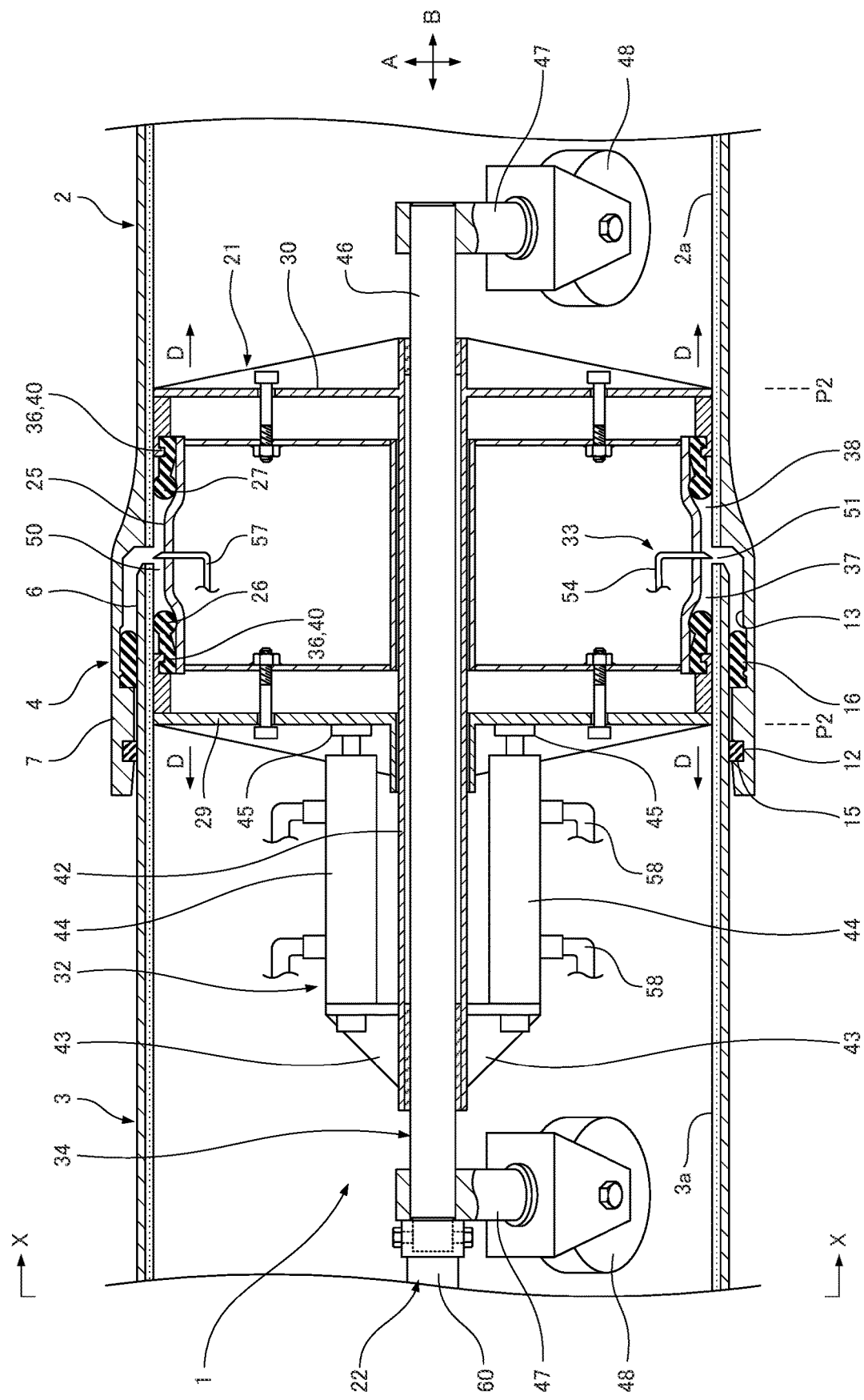
FIG. 1 is a sectional view of a testing device body of a watertightness testing device used in a watertightness testing method according to a first embodiment of the present invention showing a state where indentation of first and second sealing members has been released.
Figure 2:
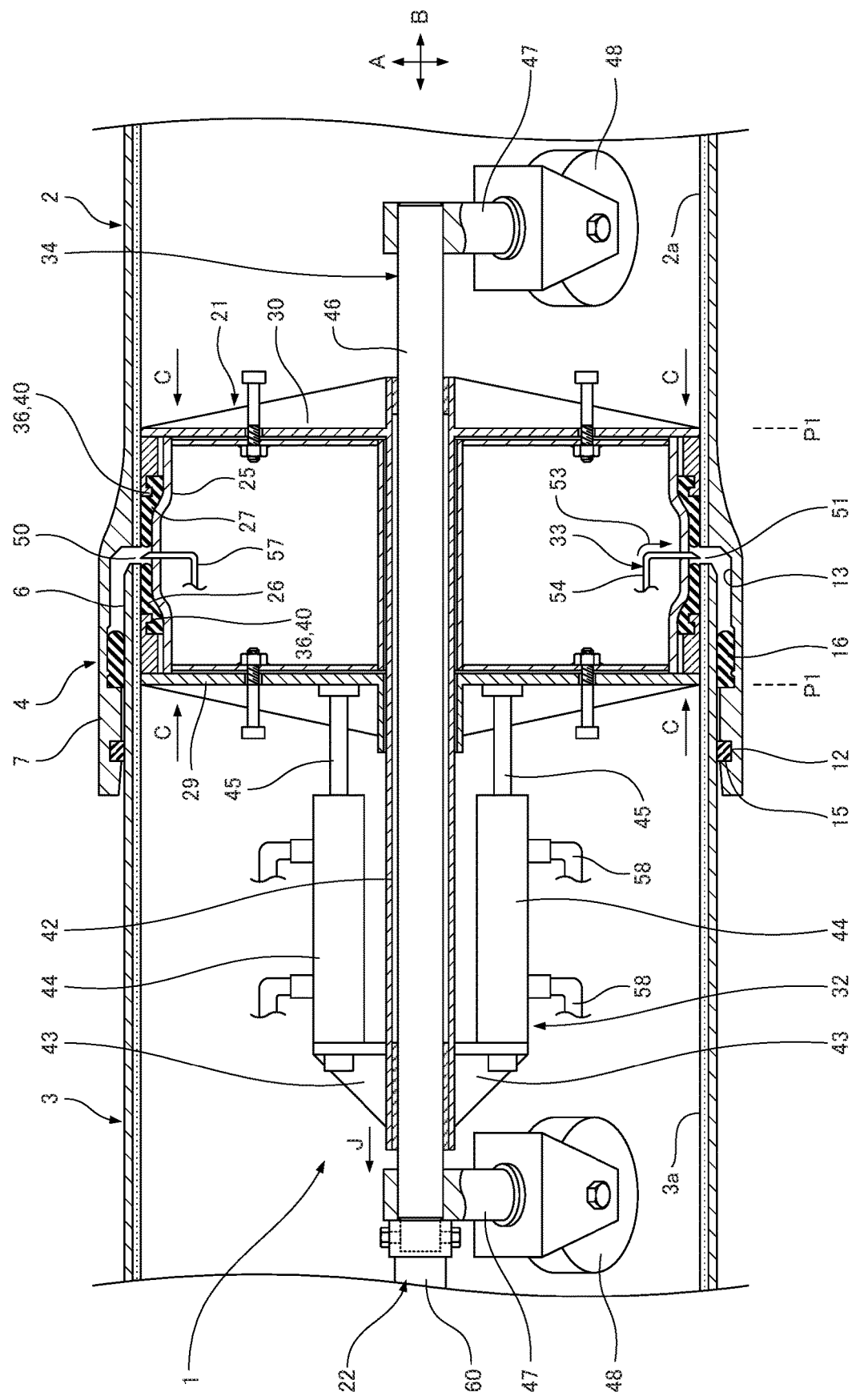
FIG. 2 is a sectional view of the testing device body of the watertightness testing device according to the first embodiment of the present invention showing a state where the first and second sealing members have been indented.
Figure 3:
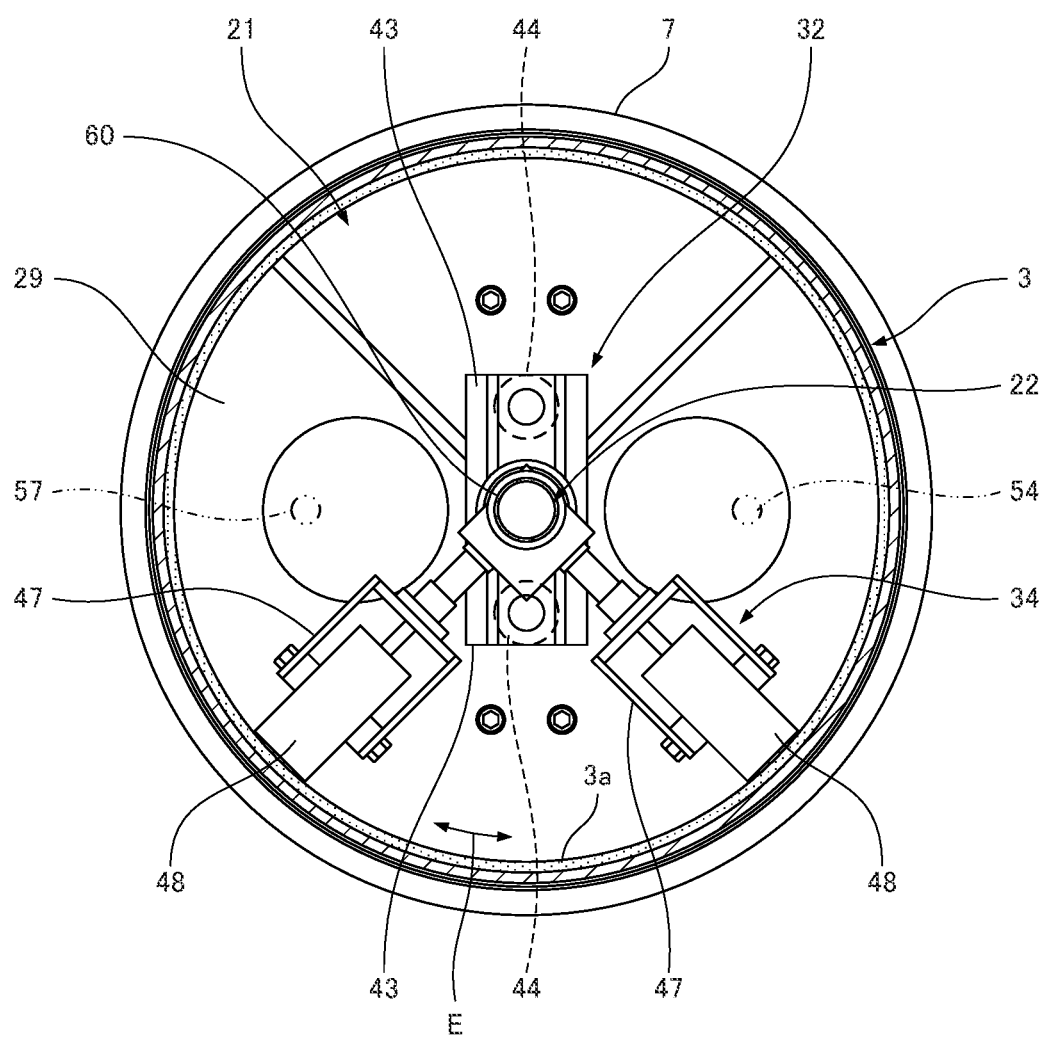
FIG. 3 is an arrow view taken along X-X in FIG. 1.

In the first embodiment, as shown in FIGS. 1 to 3, reference numeral 1 denotes a watertightness testing device for performing a watertightness test of a joined section 4 between joined pipes 2 and 3. The pipes 2 and 3 are each a PN type ductile pipe having a spigot 6 at one end section and a socket 7 at another end section. The pipes 2 and 3 are joined and arranged inside a conduit installation tunnel 9 (refer to FIG. 4) formed underground and constitute a conduit 10 (refer to FIG. 4). The pipes 2 and 3 are surrounded by an inner wall surface 9a of the conduit installation tunnel 9.

In the joined section 4, joining is achieved by inserting the spigot 6 of a second pipe 3 into the socket 7 of a first pipe 2. A locking-ring housing groove 12 and a sealing body mounting depression 13 are formed on an inner circumferential surface of the socket 7.

A locking-ring 15 for preventing separation is housed in the locking-ring housing groove 12. In addition, an annular sealing body 16 made of an elastic material such as rubber is mounted to the sealing body mounting depression 13. The sealing body 16 is sandwiched between an outer circumferential surface of the spigot 6 and the inner circumferential surface of the socket 7 and compressed in a pipe diameter direction A. Accordingly, sealing is achieved between the spigot 6 and the socket 7.

Figure 4:
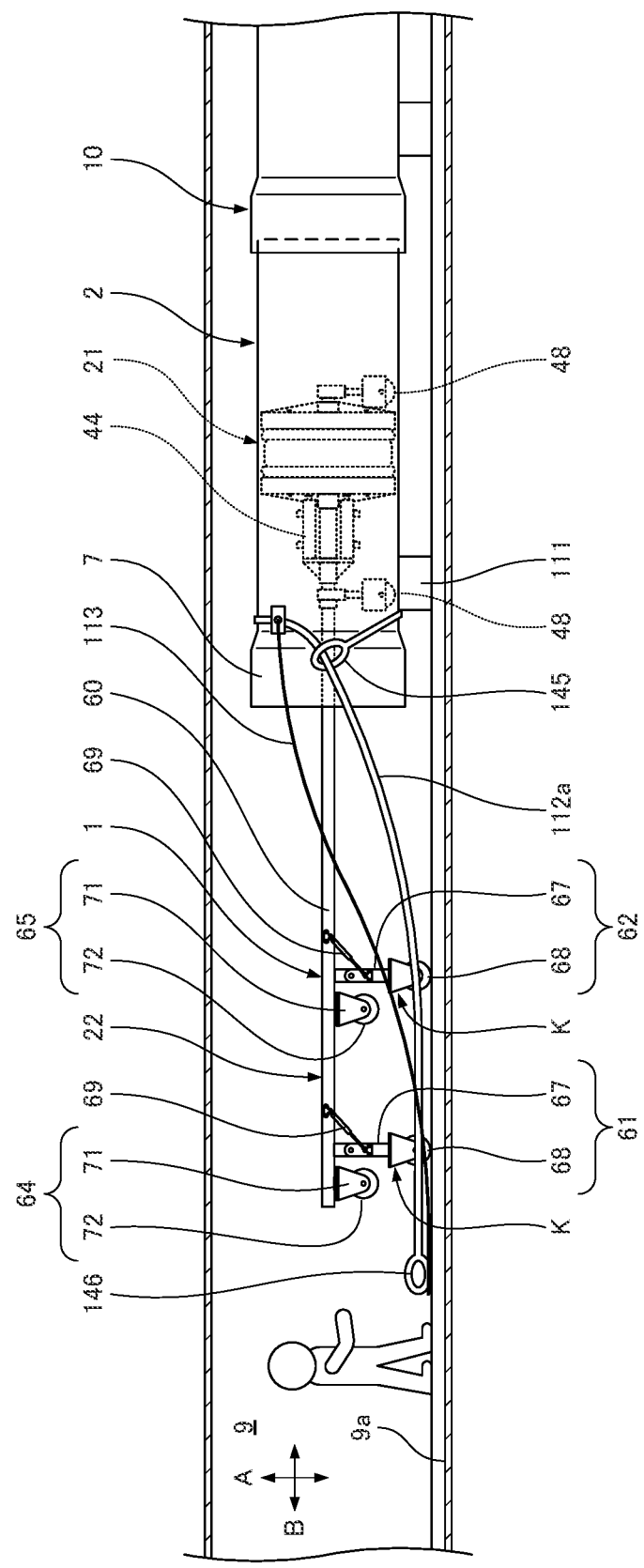
FIG. 4 is a side view showing a procedure of the watertightness testing method using the watertightness testing device according to the first embodiment of the present invention.

As shown in FIG. 4, the watertightness testing device 1 includes a testing device body 21 which performs a watertightness test of the joined section 4 inside the pipes 2 and 3 and a moving operation rod 22 for moving the testing device body 21 inside the pipes 2 and 3 in a pipe axial direction B by a remote operation.

The testing device body 21 will be described below.

As shown in FIGS. 1 to 3, the testing device body 21 has a cylindrical core 25, first and second sealing members 26 and 27, first and second indenting members 29 and 30, a moving device 32, a testing fluid supplying device 33, and a supporting device 34.

The first sealing member 26 is an annular member made of an elastic material such as rubber and provides a seal between an outer circumferential surface of the core 25 and an inner circumferential surface of the second pipe 3. In addition, the second sealing member 27 is an annular member made of an elastic material such as rubber and provides a seal between the outer circumferential surface of the core 25 and an inner circumferential surface of the first pipe 2.

An engaging depression 36 is respectively formed around a whole circumference on an outer circumferential surface of a proximal end section of the first and second sealing members 26 and 27.

A first sealing member insertion space 37 is formed around a whole circumference between the outer circumferential surface of the core 25 and the inner circumferential surface of the second pipe 3. In addition, a second sealing member insertion space 38 is formed around a whole circumference between the outer circumferential surface of the core 25 and the inner circumferential surface of the first pipe 2.

The first indenting member 29 indents and compresses the first sealing member 26 into the first sealing member insertion space 37 and has an engaging protrusion 40 formed around a whole circumference.

In addition, the second indenting member 30 indents and compresses the second sealing member 27 into the second sealing member insertion space 38 and has the engaging protrusion 40 in a similar manner to the first indenting member 29.

The engaging protrusion 40 of the first indenting member 29 is fitted into the engaging depression 36 of the first sealing member 26. Accordingly, the first sealing member 26 and the first indenting member 29 engage each other in the pipe axial direction B. In addition, the engaging protrusion 40 of the second indenting member 30 is fitted into the engaging depression 36 of the second sealing member 27. Accordingly, the second sealing member 27 and the second indenting member 30 engage each other in the pipe axial direction B.

The moving device 32 is a device that moves the first indenting member 29 and the second indenting member 30 in an indenting direction C (refer to FIG. 2) in which both indenting members 29 and 30 approach each other in the pipe axial direction B and an indentation releasing direction D (refer to FIG. 1) in which both indenting members 29 and 30 separate from each other in the pipe axial direction B.

Figure 7:
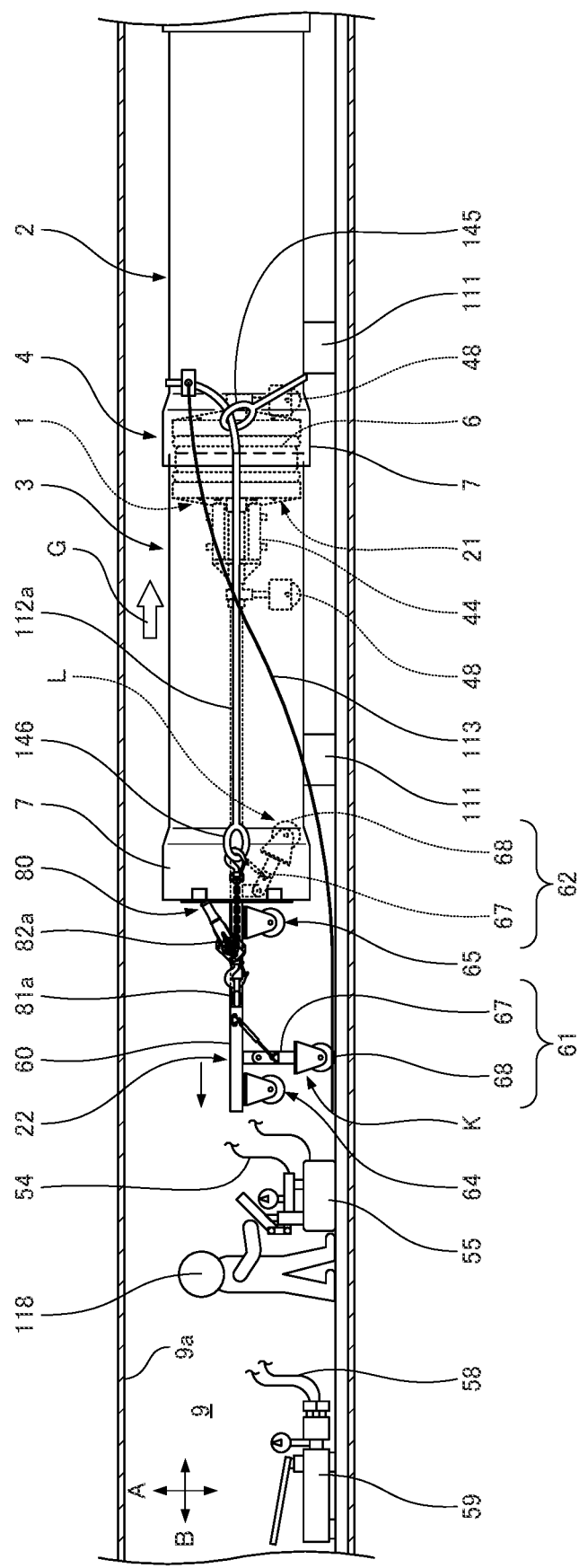
FIG. 7 is a side view showing a procedure of the watertightness testing method using the watertightness testing device according to the first embodiment of the present invention.

Specifically, the moving device 32 has a pipe-like mobile rod 42 which is attached to the second indenting member 30 and which is movable in the pipe axial direction B, a receiving member 43 provided in a tip section of the mobile rod 42, and a plurality of double-acting jacks 44 that are extensible and retractable in the pipe axial direction B. The double-acting jacks 44 are attached between the first indenting member 29 and the receiving member 43. As shown in FIG. 7, a hydraulic oil pump 59 is connected to the double-acting jacks 44 via hydraulic oil piping 58. By activating the hydraulic oil pump 59, a plunger 45 of the double-acting jacks 44 is extended and retracted.

As shown in FIGS. 1 to 3, the supporting device 34 is a device that supports the core 25, the first and second indenting members 29 and 30, and the moving device 32 and has a shaft 46 inserted into the mobile rod 42, a plurality of leg frames 47 provided in both end sections of the shaft 46, and a moving wheel 48 rotatably provided in a lower end section of the leg frames 47. The moving wheels 48 are distributed in a pipe circumferential direction E and are capable of rolling on the inner circumferential surfaces 2a and 3a of the pipes 2 and 3 in the pipe axial direction B.

As shown in FIG. 2, when the first and second indenting members 29 and 30 move in the indenting direction C and reach an indenting position P1, the first and second sealing members 26 and 27 are indented into the first and second sealing member insertion spaces 37 and 38.

In addition, as shown in FIG. 1, when the first and second indenting members 29 and 30 move in the indentation releasing direction D and return to an indentation releasing position P2, the indentation of the first and second sealing members 26 and 27 is released.

As shown in FIGS. 1 and 2, when the testing device body 21 is set to the joined section 4 in the pipes 2 and 3, a test space 50 is formed around a whole circumference between the outer circumferential surface of the core 25 and the inner circumferential surfaces 2a and 3a of the pipes 2 and 3 in the pipe diameter direction A and between the first sealing member 26 and the second sealing member 27 in the pipe axial direction B. The test space 50 is communicated with the sealing body mounting depression 13 via a gap 51 between a deep end of the socket 7 and a tip of the spigot 6.

The testing fluid supplying device 33 is a device that supplies the test space 50 with water 53 (an example of a testing fluid) from inside the core 25 and has a water supply hose 54 connected to a lower part of an inner circumference of the core 25 and a hydraulic pump 55 (refer to FIG. 7) provided at a tip of the water supply hose 54.

In addition, an air vent hose 57 for deaerating an inside of the test space 50 is connected to an upper part of the inner circumference of the core 25. The water supply hose 54 and the air vent hose 57 penetrate the first indenting member 29.

As shown in FIG. 4, the moving operation rod 22 has an elongated operation rod main body 60 which is attachably and detachably coupled to a tip section of the shaft 46 of the testing device body 21 and which extends in the pipe axial direction B, first and second main supporting members 61 and 62 which support the operation rod main body 60 on an inner wall surface 9a of the conduit installation tunnel 9 outside of the pipes 2 and 3, and first and second auxiliary supporting members 64 and 65 which support the operation rod main body 60 on the inner circumferential surface 3a inside the second pipe 3. The water supply hose 54, the air vent hose 57, and the hydraulic oil piping 58 are arranged along the moving operation rod 22 from the testing device body 21.

Each of the first and second main supporting members 61 and 62 has a leg frame 67 suspended downward from the operation rod main body 60 and a pair of main wheels 68 provided in a lower end section of the leg frame 67. The pair of main wheels 68 are distributed in the pipe circumferential direction E.

In addition, the leg frame 67 can be switched between a supporting posture K (refer to FIG. 4) in which the leg frame 67 extends in the pipe diameter direction A and a folded posture L (refer to FIG. 5) in which the leg frame 67 is folded inside the pipe 3. The leg frame 67 is urged from the folded posture L to the supporting posture K by a spring cylinder 69.

Figure 8:
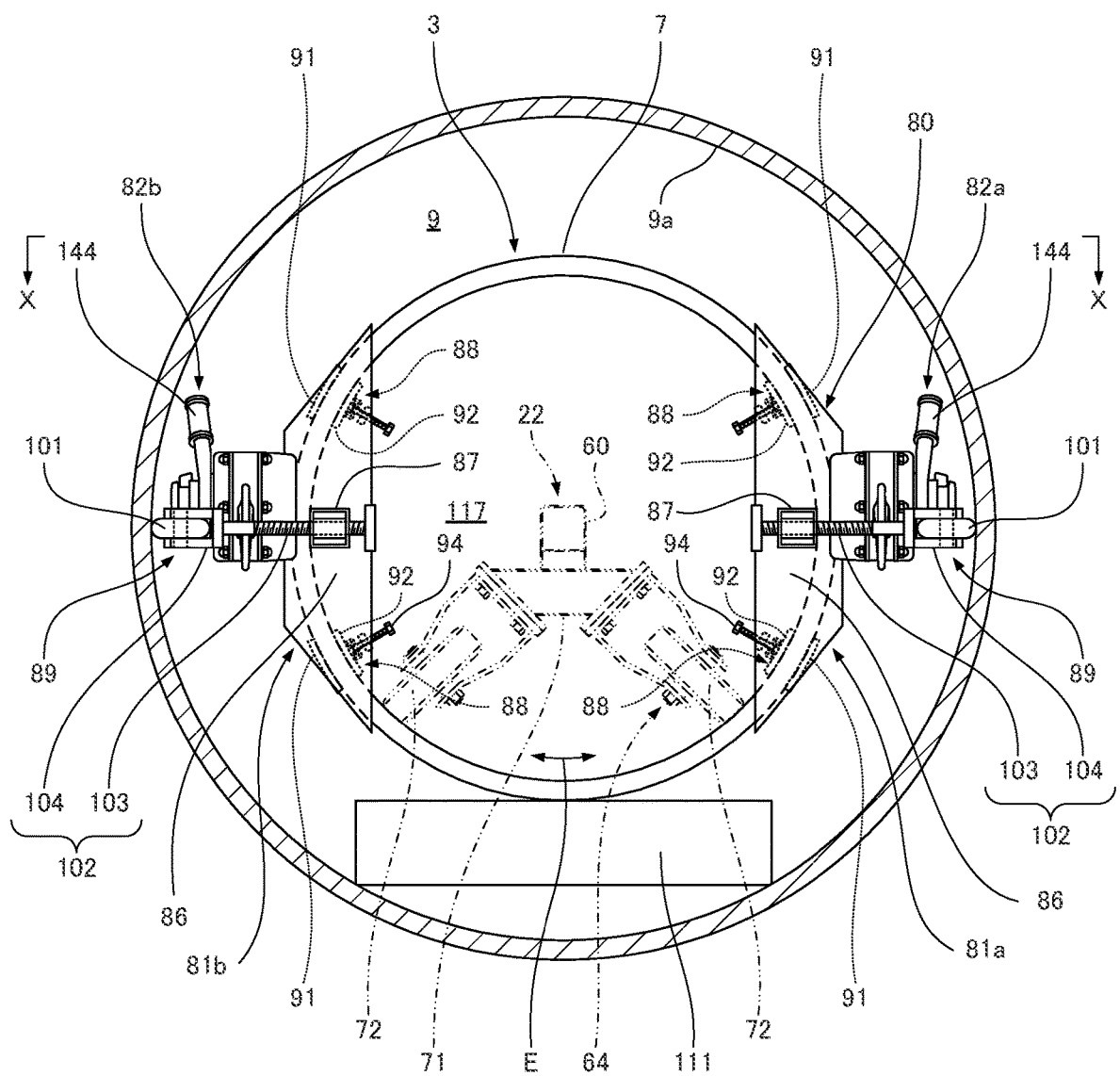
FIG. 8 is an arrow view taken along X-X in FIG. 6.

Each of the first and second auxiliary supporting members 64 and 65 has an attached frame 71 attached to a lower side of the operation rod main body 60 and a pair of auxiliary wheels 72 provided in a lower end section of the attached frame 71. As shown in FIG. 8, the pair of auxiliary wheels 72 are distributed in the pipe circumferential direction E.

In addition, when a watertightness test of the joined section 4 of the pipes 2 and 3 is to be performed, an assembling device 80 such as that shown in FIGS. 8 to 14 is used.

As shown in FIGS. 6 to 10, the assembling device 80 has a pair of frame bodies 81a and 81b which are attachable to and detachable from an opening end section (an example of an other end section) of the socket 7 of the second pipe 3 and which are divided left and right and attaching plates 83a and 83b (an example of an attaching section) for attaching a pair of left and right lever hoists 82a and 82b (an example of a pulling device) to the frame bodies 81a and 81b.

Each of the lever hoists 82a and 82b has an anchor hook 141 provided on a main body side and a connecting hook 143 provided on a tip of a chain 142.

Figure 11:
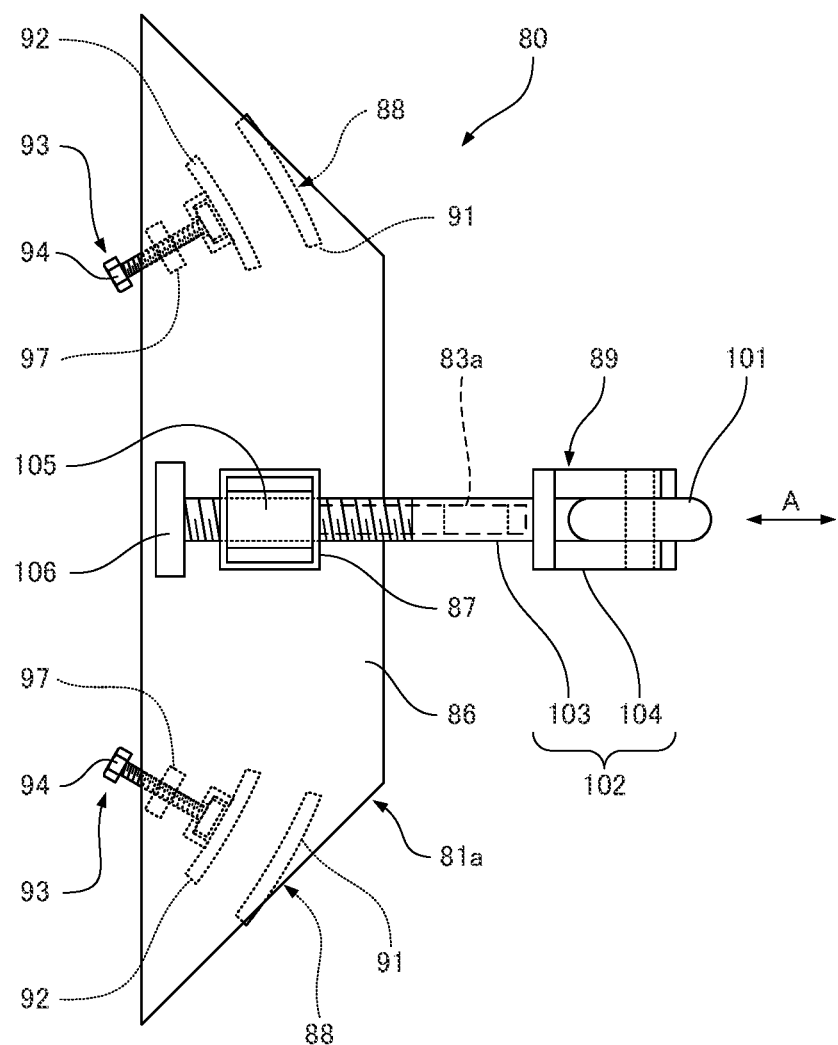
FIG. 11 is a front view of one of two frame bodies of an assembling device used in the watertightness testing method according to the first embodiment of the present invention.
Figure 12:
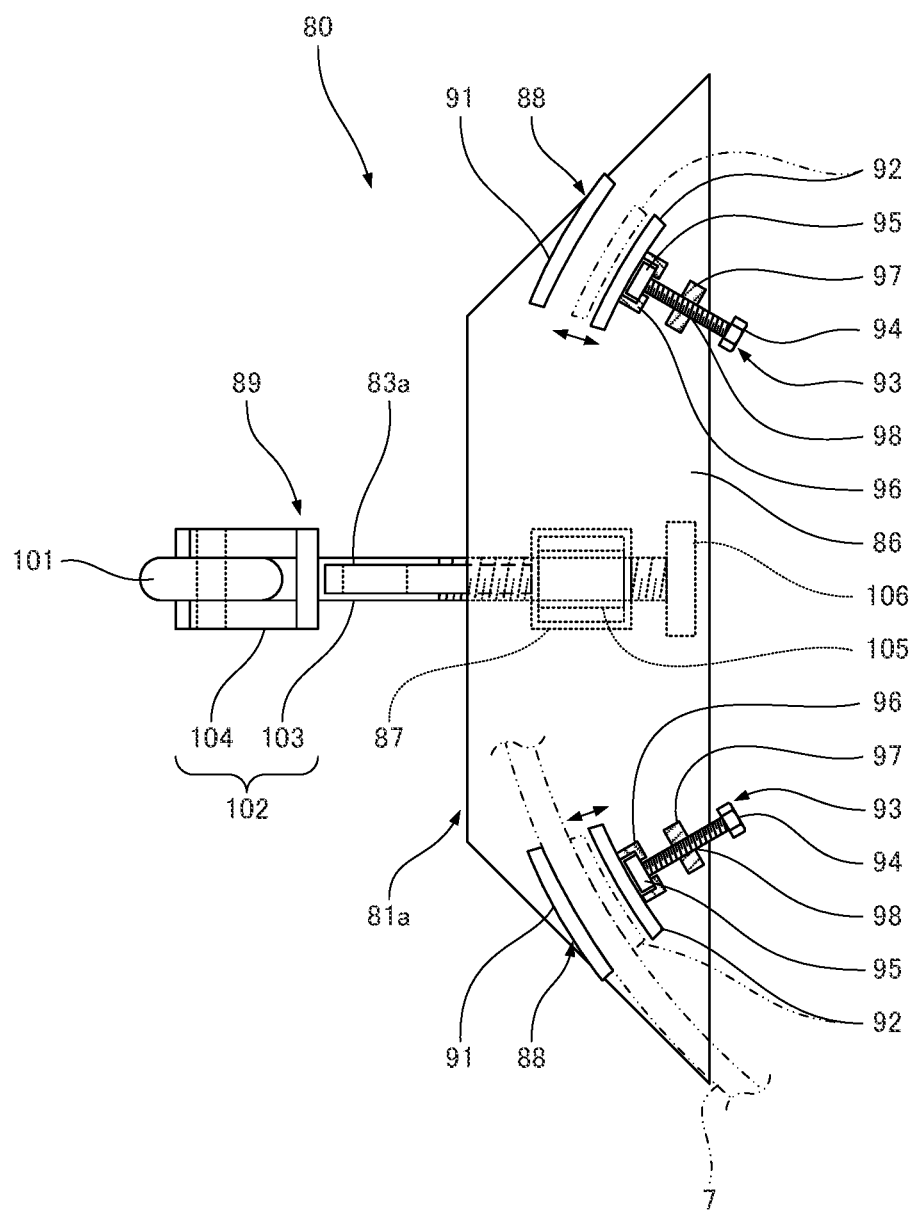
FIG. 12 is a rear view of one of the frame bodies of the assembling device according to the first embodiment of the present invention.

As shown in FIGS. 11 and 12, one frame body 81a has a mounting plate 86 which is attachable to and detachable from the opening end surface of the socket 7, a strut 87 which is provided on a front surface of the mounting plate 86 and which extends in the pipe axial direction B, two sets of clamping mechanisms 88 which sandwich the opening end section of the socket 7 in the pipe diameter direction A, and a fall prevention device 89 for preventing the frame bodies 81 attached to the opening end section of the socket 7 of the second pipe 3 from falling toward outside 90 in the pipe diameter direction A.

Each of the two clamping mechanisms 88 has a pair of a fixed plate 91 and a mobile plate 92 which oppose each other in the pipe diameter direction A and a moving member 93 which moves the mobile plate 92 relative to the fixed plate 91 in the pipe diameter direction A. The fixed plate 91 is fixed to a rear surface of the mounting plate 86.

The moving member 93 has a bolt body 94 having a male screw on an outer circumference thereof, an engaging piece 95 provided on a tip of the bolt body 94, an engaging member 96 provided on the mobile plate 92, and a supporting plate 97 which supports the bolt body 94.

The supporting plate 97 is provided on the rear surface of the mounting plate 86 and a screw hole 98 having a female screw is formed on the supporting plate 97. The bolt body 94 is rotatably inserted through the screw hole 98 in a state where the male screw and the female screw are screwed and the bolt body 94 is supported by the supporting plate 97. A diameter of the engaging piece 95 is larger than that of the bolt body 94 and the engaging piece 95 and the engaging member 96 engage each other in an axial center direction of the bolt body 94.

Figure 13:
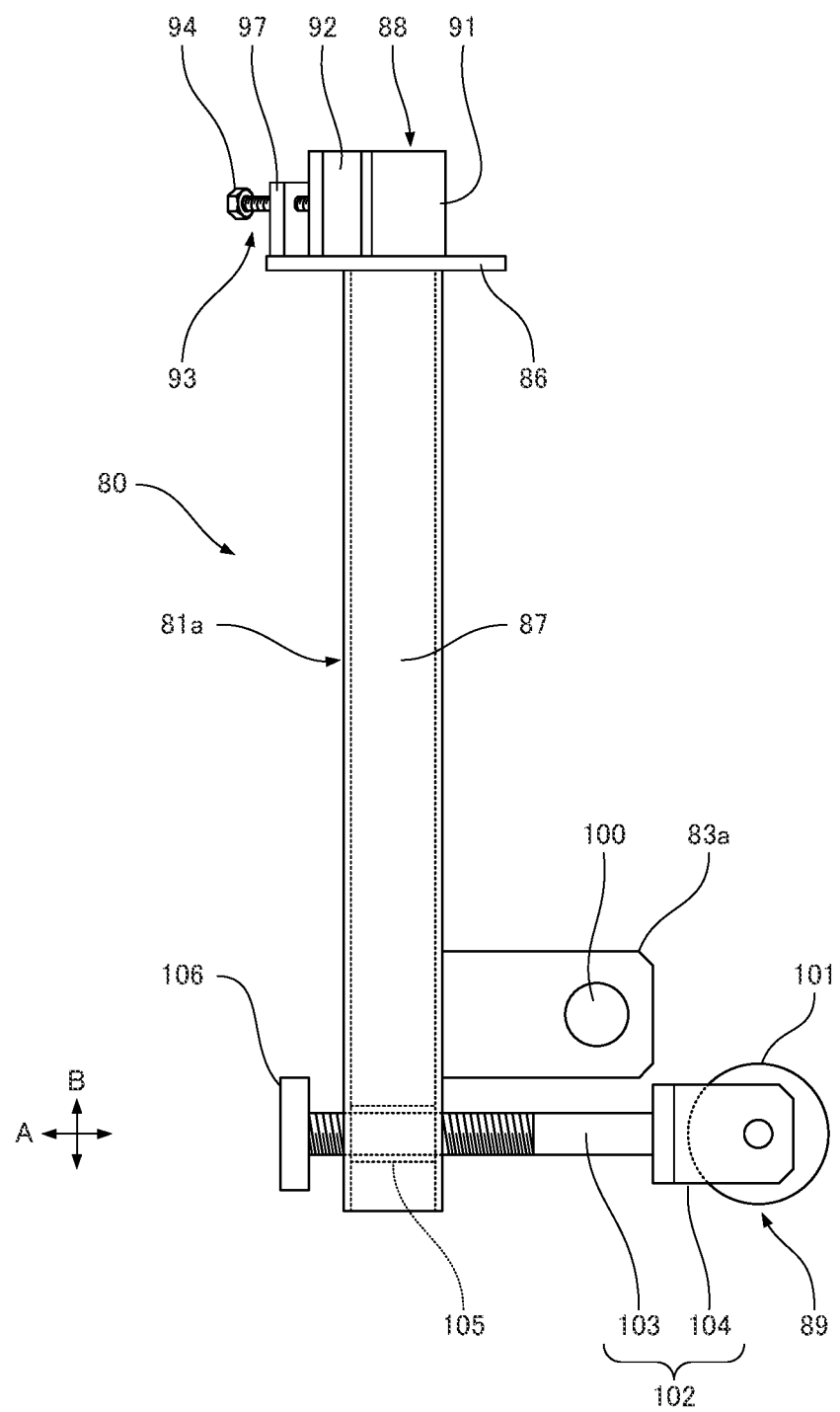
FIG. 13 is a plan view of one of the frame bodies of the assembling device according to the first embodiment of the present invention.
Figure 14:
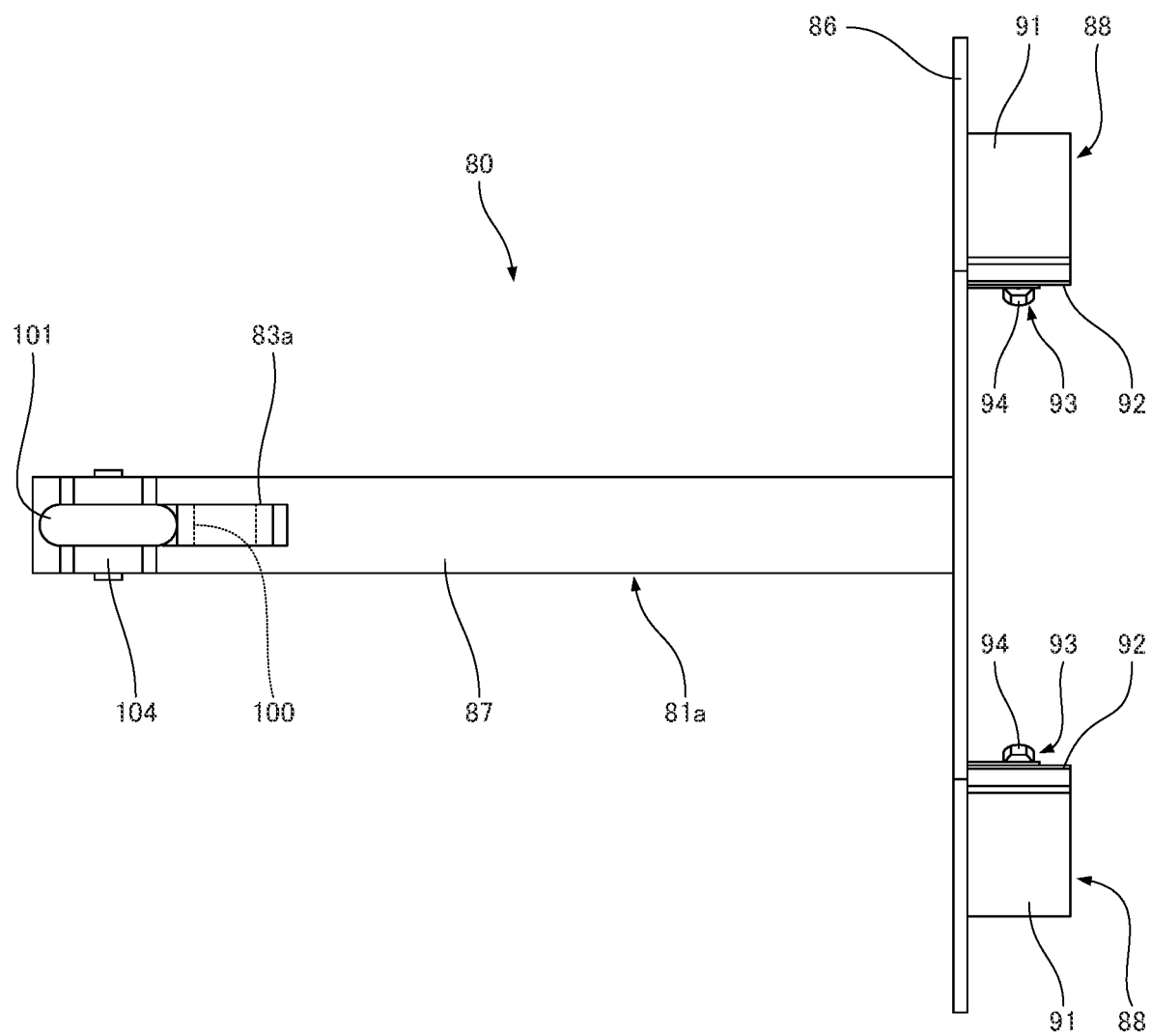
FIG. 14 is a side view of one of the frame bodies of the assembling device according to the first embodiment of the present invention.
Figure 15:
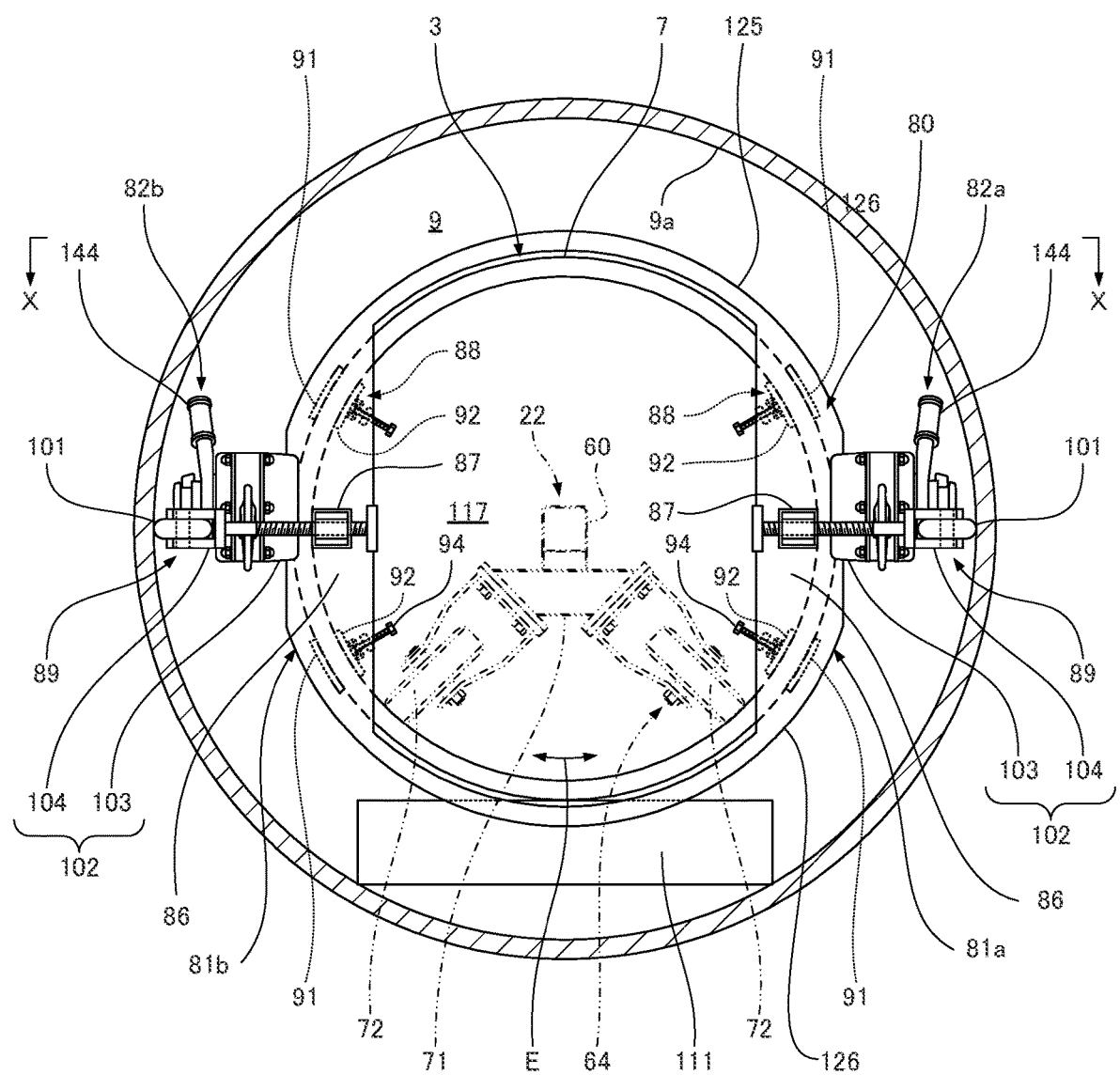
FIG. 15 is a front view of an assembling device according to a second embodiment.
Figure 16:
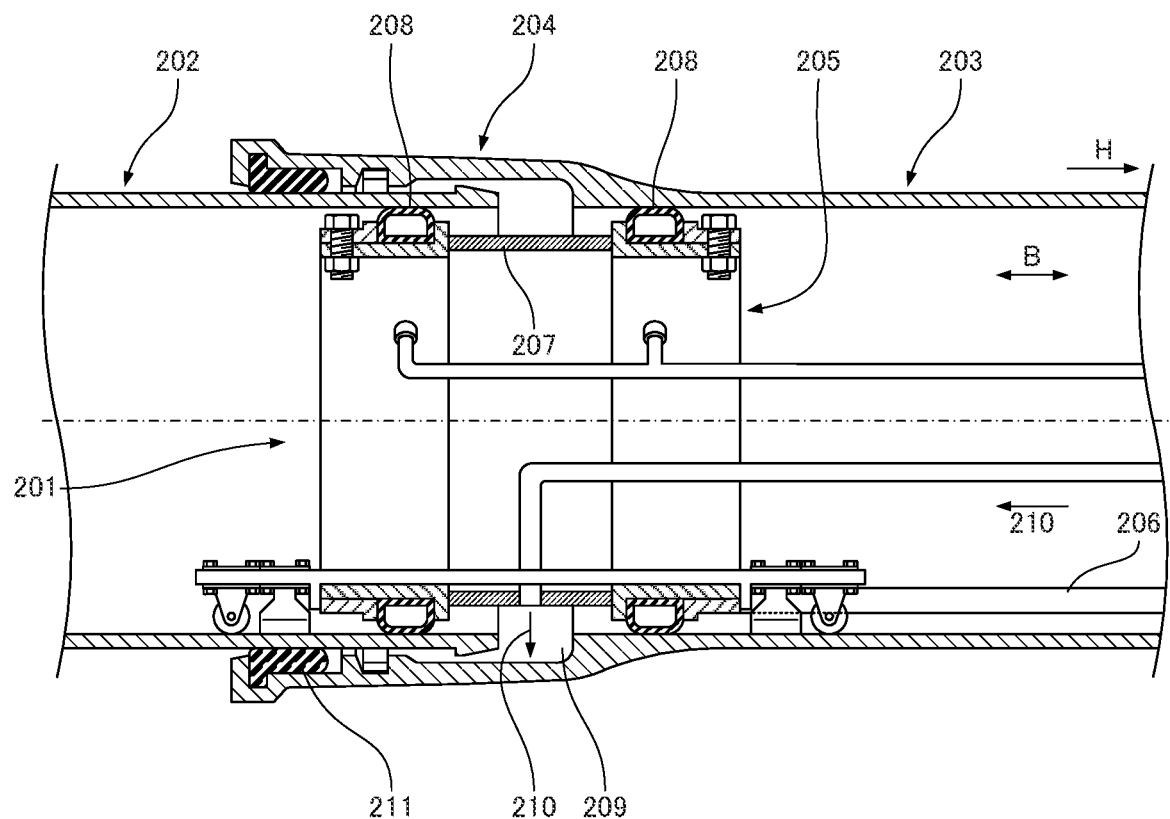
FIG. 16 is a sectional view for describing a watertightness testing method using a conventional watertightness testing device.

As shown in FIG. 13, one of the attaching plates 83a has an attaching hole 100 and is provided on an outside surface of the strut 87 of one of the frame bodies 81a in the pipe diameter direction A.

As shown in FIGS. 8 to 10 and 13, the fall prevention device 89 has a roller 101 (an example of a rolling element) which can come into contact with the inner wall surface 9a of the conduit installation tunnel 9 and a position adjuster 102 which moves a position of the roller 101 in the pipe diameter direction A.

The position adjuster 102 has a screw shaft 103 which penetrates the strut 87 of the frame bodies 81 in the pipe diameter direction A, a bracket 104 provided on a tip of the screw shaft 103, and an operating handle 106 for rotationally operating the screw shaft 103. The roller 101 is rotatably provided on the bracket 104.

In addition, the screw shaft 103 has a male screw on an outer circumference thereof and screws with a female screw of a nut body 105 provided on the strut 87. The screw shaft 103 and the bracket 104 are relatively rotatably coupled to each other around an axial center of the screw shaft 103.

While the one frame body 81a is configured as described above, the other frame body 81b is also configured in a same manner as the one frame body 81a.

Figure 9:
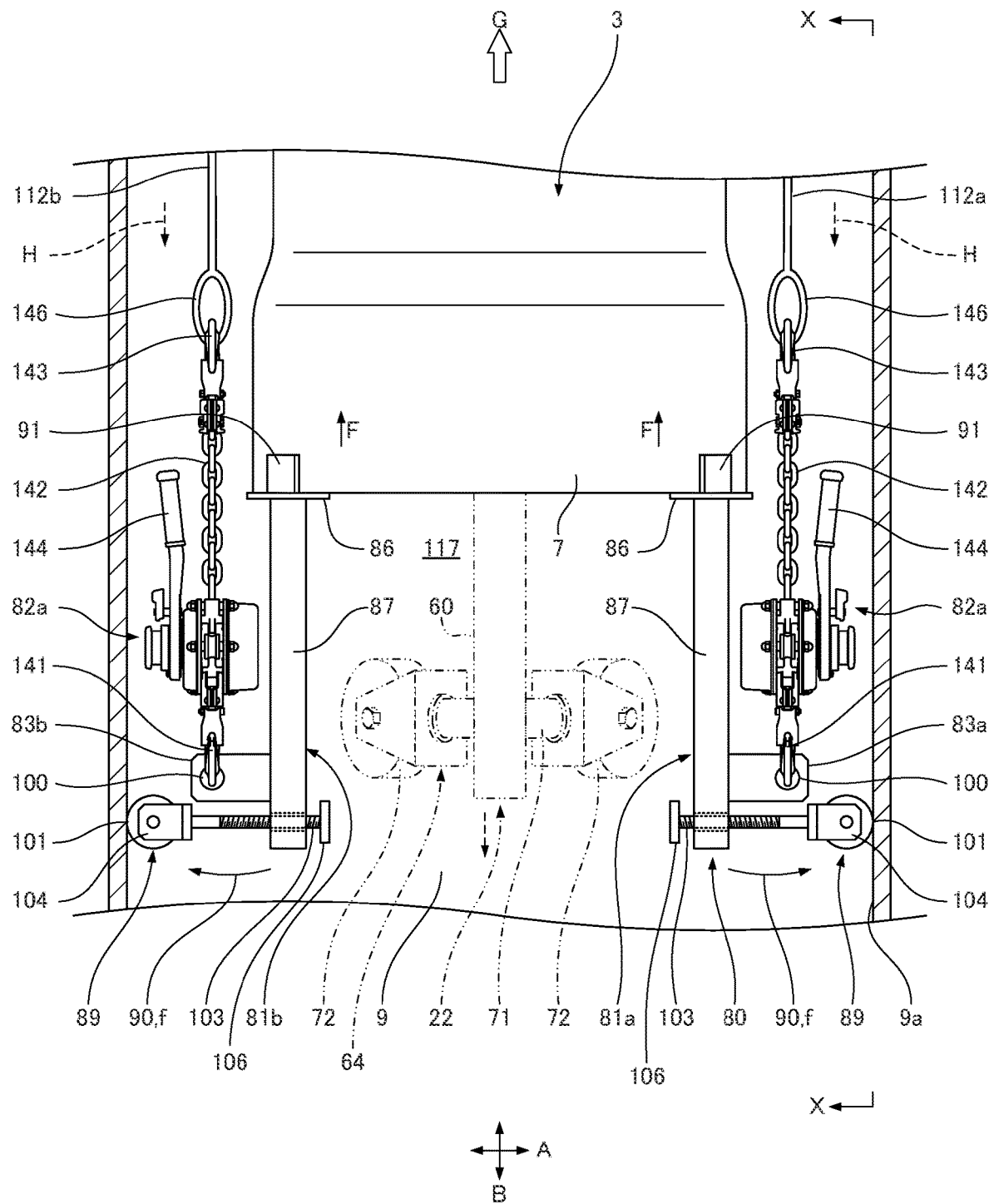
FIG. 9 is an arrow view taken along X-X in FIG. 8.
Figure 10:
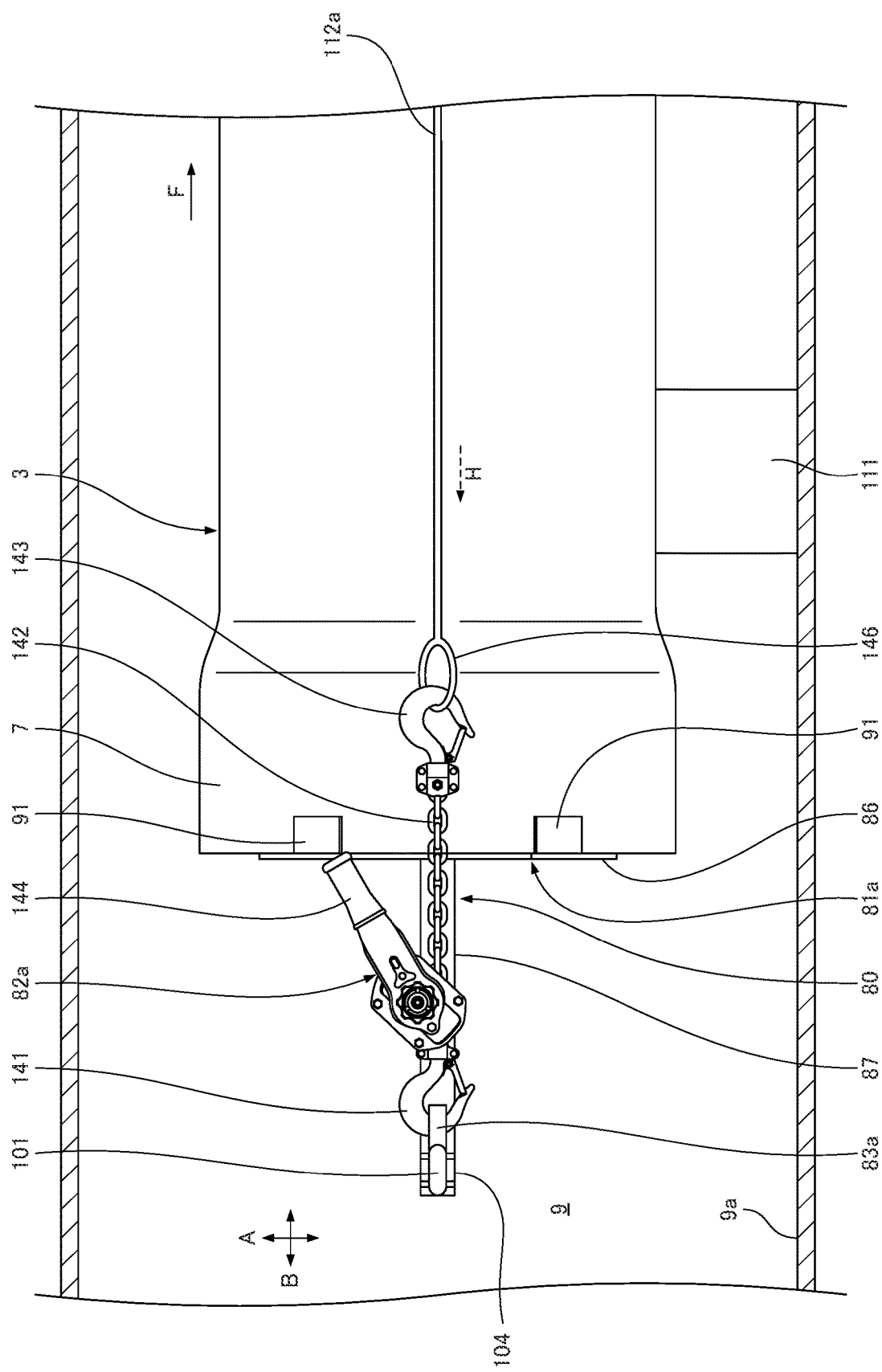
FIG. 10 is an arrow view taken along X-X in FIG. 9.

According to the assembling device 80 described above, as indicated by an imaginary line in FIG. 12, the opening end section of the socket 7 is inserted between the fixed plate 91 and the mobile plate 92 of the clamping mechanism 88 of the one frame body 81a and the bolt body 94 is rotated in one direction to bring the mobile plate 92 close to the fixed plate 91. Accordingly, a distance between the fixed plate 91 and the mobile plate 92 in the pipe diameter direction A is reduced, the opening end section of the socket 7 is sandwiched between the fixed plate 91 and the mobile plate 92, and the one frame body 81a is attached to the opening end section of the socket 7 as shown in FIGS. 8 to 10.

In addition, in a similar manner to attaching the one frame body 81a, the other frame body 81b can be attached to the opening end section of the socket 7.

A watertightness testing method of testing watertightness of the joined section 4 of the pipes 2 and 3 using the watertightness testing device 1 described above will be described below.

As shown in FIG. 4, the first pipe 2 is a pipe at a tail end of the conduit 10 which has already been joined inside the conduit installation tunnel 9 and is supported by a support table 111 made of crossties or the like. In this state, first, the testing device body 21 of the watertightness testing device 1 is inserted into the first pipe 2.

At this point, the operation rod main body 60 of the moving operation rod 22 protrudes outside of an end section of the first pipe 2 from the socket 7 of the first pipe 2 and is supported on the inner wall surface 9a of the conduit installation tunnel 9 by the first and second main supporting members 61 and 62 having been switched to the supporting posture K.

The locking-ring 15 has been housed in advance in the locking-ring housing groove 12 and the sealing body 16 has been mounted in advance to the sealing body mounting depression 13 inside the socket 7 of the first pipe 2.

In addition, the plunger 45 of the double-acting jack 44 of the testing device body 21 is shortened and the first and second indenting members 29 and 30 are returned to the indentation releasing position P2 (refer to FIG. 1).

Furthermore, as shown in FIG. 4, two sling belts 112a and 112b (an example of a strap-shaped member) are wound around an outer circumference of the socket 7 of the first pipe 2 in advance in a state of being distributed left and right (refer to FIG. 9). At the same time, a recovery rope 113 for recovering both sling belts 112a and 112b is connected to each of the sling belts 112a and 112b. Each of the sling belts 112a and 112b has eye sections 145 and 146 at both ends thereof.

Figure 5:
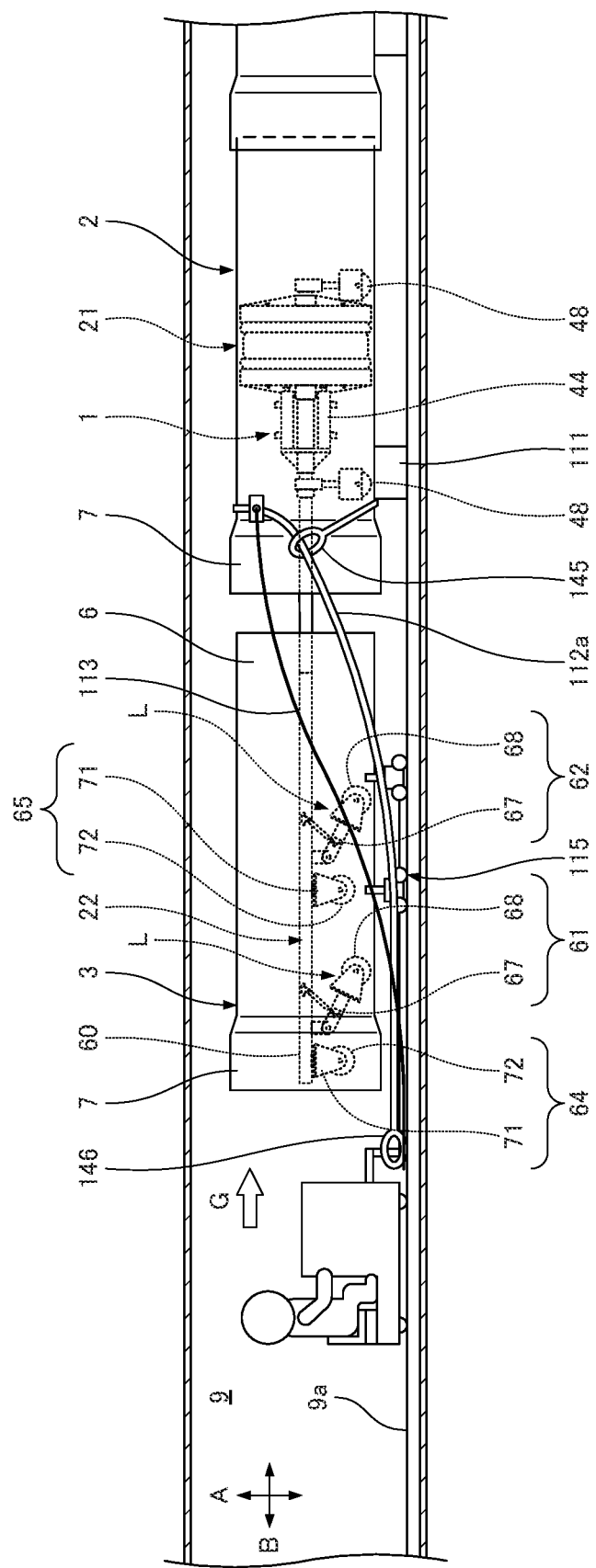
FIG. 5 is a side view showing a procedure of the watertightness testing method using the watertightness testing device according to the first embodiment of the present invention.

Next, as shown in FIG. 5, the second pipe 3 is loaded on a transfer carriage 115 and the transfer carriage 115 is caused to travel in a joining direction G to transfer the second pipe 3 up to a front side of the first pipe 2.

In doing so, due to an opening end section of the spigot 6 of the second pipe 3 coming into contact with the first and second main supporting members 61 and 62 of the moving operation rod 22 of the watertightness testing device 1, the leg frames 67 of the first and second main supporting members 61 and 62 are switched from the supporting posture K to the folded posture L and the moving operation rod 22 is inserted into the second pipe 3. At this point, the operation rod main body 60 is supported on the inner circumferential surface 3a of the second pipe 3 by the first and second auxiliary supporting members 64 and 65.

Subsequently, the assembling device 80 is attached to the opening end section of the socket 7 of the second pipe 3. Specifically, as indicated by an imaginary line in FIG. 12, by inserting the opening end section of the socket 7 of the second pipe 3 between the fixed plate 91 and the mobile plate 92 of the one frame body 81a and rotating the bolt body 94 in one direction to bring the mobile plate 92 close to the fixed plate 91, the opening end section of the socket 7 of the second pipe 3 is sandwiched between the mobile plate 92 and the fixed plate 91 in the pipe diameter direction A. Accordingly, as shown in FIGS. 6 and 8 to 10, the one frame body 81a is attached to the opening end section of the socket 7 of the second pipe 3.

By attaching the other frame body 81b to the opening end section of the socket 7 of the second pipe 3 in a similar manner, the assembling device 80 is attached to the opening end section of the socket 7 of the second pipe 3.

In doing so, as shown in FIGS. 8 and 9, a passage space 117 for pulling out the moving operation rod 22 is secured between the one frame body 81a and the other frame body 81b in a central part of the socket 7 (the other end section) of the second pipe 3 and in the pipe diameter direction A. The one and the other frame bodies 81a and 81b are arranged around the passage space 117.

In addition, as shown in FIGS. 9 and 10, the anchor hook 141 of one lever hoist 82a is hooked to the attaching hole 100 of one attaching plate 83a and the connecting hook 143 is hooked to the eye section 146 of one sling belt 112a. Furthermore, the anchor hook 141 of the other lever hoist 82b is hooked to the attaching hole 100 of the other attaching plate 83b and the connecting hook 143 is hooked to the eye section 146 of the other sling belt 112b.

Accordingly, both left and right lever hoists 82a and 82b are attached to the assembling device 80 and connected to both left and right sling belts 112a and 112b. In doing so, as shown in FIG. 9, the one lever hoist 82a is positioned toward outside in the pipe diameter direction A of the one frame body 81a and the other lever hoist 82b is positioned toward outside in the pipe diameter direction A of the other frame body 81b.

Figure 6:
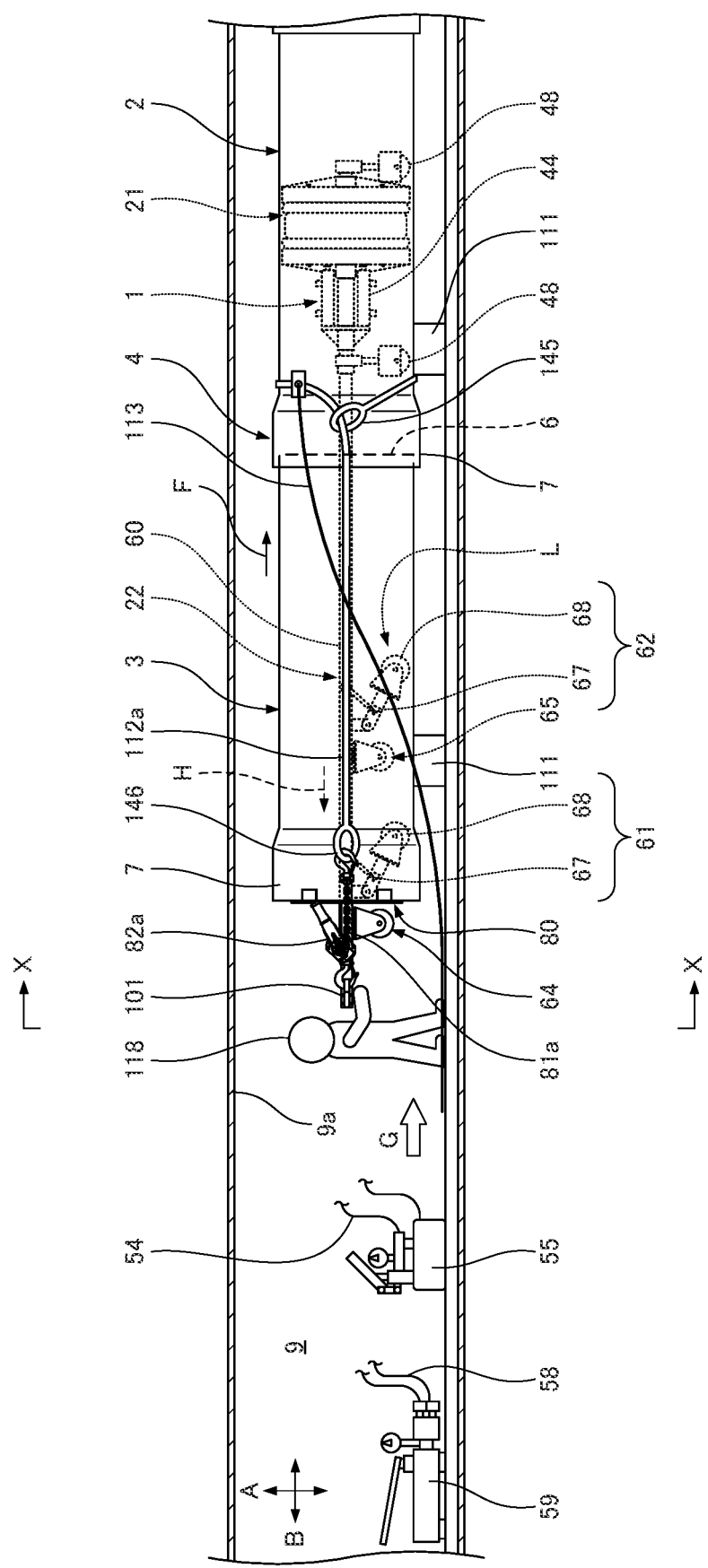
FIG. 6 is a side view showing a procedure of the watertightness testing method using the watertightness testing device according to the first embodiment of the present invention.

Subsequently, as shown in FIGS. 6, 9, and 10, due to a worker 118 operating a lever 144 of both lever hoists 82a and 82b, both sling belts 112a and 112b are pulled in the separating direction H of the second pipe 3 and a reaction force F is generated in the second pipe 3 in reaction thereto. The second pipe 3 is pulled in the joining direction G by the reaction force F and the spigot 6 (the one end section) of the second pipe 3 is inserted into the socket 7 of the first pipe 2. Accordingly, the second pipe 3 is joined to the first pipe 2.

In doing so, as shown in FIGS. 6, 8, and 9, a tip section of the moving operation rod 22 of the watertightness testing device 1 passes through the passage space 117 and protrudes outside of an end section from the socket 7 of the second pipe 3 without interfering with the assembling device 80. In addition, the second pipe 3 is supported by the support table 111.

As described above, in a state where the second pipe 3 is being pulled in the joining direction G using the lever hoists 82a and 82b, as shown in FIG. 7, the worker 118 operates the tip section of the moving operation rod 22 of the watertightness testing device 1 from outside of an end section of the socket 7 of the second pipe 3 and moves the testing device body 21 to the joined section 4 of the pipes 2 and 3.

In doing so, as shown in FIGS. 8 and 9, the moving operation rod 22 passes through the passage space 117 and protrudes outside of the end section from the socket 7 of the second pipe 3 without interfering with the assembling device 80. Therefore, the moving operation rod 22 can be readily pulled outside from the socket 7 of the second pipe 3. At this point, as shown in FIG. 7, since the first main supporting member 61 is pulled outside of the second pipe 3 and switched from the folded posture L to the supporting posture K, the operation rod main body 60 is supported on the inner wall surface 9a of the conduit installation tunnel 9 by the first main supporting member 61.

In addition, as shown in FIG. 1, since the first and second indenting members 29 and 30 have been returned to the indentation releasing position P2, compression of the first and second sealing members 26 and 27 is released and the testing device body 21 can be readily moved in the pipe axial direction B.

Subsequently, a watertightness test of the joined section 4 is performed using the testing device body 21. In doing so, as shown in FIG. 2, by activating the hydraulic oil pump 59 (refer to FIG. 7) and extending the plunger 45 of the double-acting jack 44, the first indenting member 29 moves in the indenting direction C and reaches the indenting position P1. At the same time, the mobile rod 42 of the moving device 32 moves in an opposite direction J to the first indenting member 29 and the second indenting member 30 moves in the indenting direction C and reaches the indenting position P1.

Accordingly, the first indenting member 29 indents the first sealing member 26 into the first sealing member insertion space 37 and compresses the first sealing member 26 and the second indenting member 30 indents the second sealing member 27 into the second sealing member insertion space 38 and compresses the second sealing member 27. As a result, a space between the outer circumferential surface of the core 25 and the inner circumferential surface of the second pipe 3 is sufficiently sealed by the compressed first sealing member 26 and a space between the outer circumferential surface of the core 25 and the inner circumferential surface of the first pipe 2 is sufficiently sealed by the compressed second sealing member 27.

Subsequently, the hydraulic pump 55 (refer to FIG. 7) is activated to supply water 53 to the test space 50 from the water supply hose 54. Accordingly, while air inside the test space 50 and inside the sealing body mounting depression 13 is discharged through the air vent hose 57, the water 53 supplied to the test space 50 passes through the gap 51 and fills the sealing body mounting depression 13. In a state where the test space 50 and the sealing body mounting depression 13 are filled with the water 53 with predetermined pressure in this manner, a watertightness test of the joined section 4 of the pipes 2 and 3 is performed by inspecting a presence or absence of leakage or the like of the water 53 from the sealing body 16.

According to the watertightness testing method described above, as shown in FIG. 7, since a watertightness test of the joined section 4 of the pipes 2 and 3 is performed using the testing device body 21 in a state where the second pipe 3 is being pulled in the joining direction G after joining the second pipe 3 to the first pipe 2 using the lever hoists 82a and 82b, the second pipe 3 is restrained by the first pipe 2 via the assembling device 80, the lever hoists 82a and 82b, and the sling belts 112a and 112b in the pipe axial direction B while the watertightness test is in progress. Accordingly, as shown in FIG. 2, the second pipe 3 can be prevented from becoming detached from the first pipe 2 by pressure of the water 53 that fills the test space 50 and the sealing body mounting depression 13 during the watertightness test.

In addition, as shown in FIG. 6, when the worker 118 operates the lever 144 of the one lever hoist 82a and pulls the one sling belt 112a in the separating direction H of the second pipe 3, as shown in FIG. 9, an outward external force f in the pipe diameter direction A acts on the one frame body 81a. As the roller 101 of the fall prevention device 89 comes into contact with the inner wall surface 9a of the conduit installation tunnel 9 against the external force f, the one frame body 81a is supported on a side of the inner wall surface 9a by the fall prevention device 89. Accordingly, the one frame body 81a can be prevented from falling toward outside 90 in the pipe diameter direction A.

In a similar manner, since the other frame body 81b is also supported on the side of the inner wall surface 9a of the conduit installation tunnel 9 by the fall prevention device 89, the other frame body 81b can be prevented from falling toward outside 90 in the pipe diameter direction A.

In addition, when joining the second pipe 3 to the first pipe 2, since the roller 101 of the fall prevention device 89 rolls in the joining direction G while maintaining contact with the inner wall surface 9a of the conduit installation tunnel 9 as the second pipe 3 moves in the joining direction G, the assembling device 80 smoothly moves together with the second pipe 3 in the joining direction G.

Furthermore, by operating the operating handle 106 of the position adjuster 102 and rotating the screw shaft 103, the position of the roller 101 moves in the pipe diameter direction A. Accordingly, by moving the position of the roller 101 in the pipe diameter direction A in accordance with a position of the inner wall surface 9a of the conduit installation tunnel 9, the roller 101 can be reliably brought into contact with the inner wall surface 9a of the conduit installation tunnel 9.

In addition, after performing a watertightness test of the joined section 4 as described above, by repetitively performing a procedure including temporarily detaching the assembling device 80, the lever hoists 82a and 82b, and the sling belts 112a and 112b, joining another pipe to the second pipe 3, and performing a watertightness test of the joined section, a watertightness test of a joined section can be performed while joining pipes to each other.

As shown in FIG. 12, by rotating the bolt body 94 of the assembling device 80 in the other direction to separate the mobile plate 92 from the fixed plate 91 and detaching both frame bodies 81a and 81b from the opening end section of the socket 7 of the second pipe 3, the testing device body 21 can be taken outside from the opening end section of the socket 7 of the second pipe 3.

Furthermore, by operating the recovery rope 113 after detaching the frame bodies 81a and 81b and the lever hoists 82a and 82b of the assembling device 80, the sling belts 112a and 112b can be separated from the outer circumference of the socket 7 of the first pipe 2 and can be recovered.

Second Embodiment

While an assembling device 80 has a pair of frame bodies 81a and 81b having been divided left and right as shown in FIG. 8 in the first embodiment described above, as a second embodiment, a mounting plate 86 of one frame body 81a and a mounting plate 86 of another frame body 81b may be coupled to each other by a pair of upper and lower coupling frames 125 and 126. In this case, a passage space 117 is secured between the left and right backing plates 86 of the frame bodies 81a and 81b and between the upper and lower coupling frames 125 and 126.

In addition, in the respective embodiments described above, while the two frame bodies 81a and 81b are attached to the socket 7 of the second pipe 3 by being distributed at angles that differ by 180 degrees as shown in FIG. 8, the number of frame bodies is not limited to two. For example, three frame bodies may be attached to the socket 7 of the second pipe 3 by being distributed at angles that differ by 120 degrees.

Furthermore, in the respective embodiments described above, while a moving operation rod 22 has an operation rod main body 60, main supporting members 61 and 62, and auxiliary supporting members 64 and 65 as shown in FIG. 4, the moving operation rod 22 may not include at least one of the main supporting members 61 and 62 and the auxiliary supporting members 64 and 65.

Moreover, while a case where pipes are laid in a conduit installation tunnel 9 that is an existing pipeline, a tunnel, a shield, or the like has been described in the embodiments presented above, the present invention is not limited to cases inside the conduit installation tunnel 9 and can also be applied to a case (an open-cut method) in which pipes are laid inside a groove cut out from ground.

The invention claimed is:

1. A watertightness testing method for testing watertightness of a joined section where one end section of a second pipe is joined to a first pipe, the watertightness testing method comprising:
    inserting, into the first pipe, a testing device body of a watertightness testing device for performing a watertightness test inside a pipe;
    attaching an assembling device to another end section of the second pipe;
    attaching a pulling device to the assembling device and connecting the pulling device to a strap-shaped member having been wound in advance around an outer circumference of the first pipe;
    operating the pulling device and pulling the strap-shaped member in a separating direction of the second pipe to have a reaction force generated in the second pipe cause the second pipe to be pulled in a joining direction, the one end section of the second pipe to be inserted into an end section of the first pipe, and the one end section of the second pipe to be joined to the first pipe; and
    operating a moving operation rod provided in the testing device body from outside of the other end section of the second pipe in a state where the second pipe is being pulled in the joining direction to move the testing device body to the joined section inside the pipe and performing a watertightness test of the joined section.

2. The watertightness testing method according to claim 1, wherein when operating the moving operation rod from outside of the other end section of the second pipe to move the testing device body to the joined section inside the pipe, the moving operation rod is passed through a passage space secured in a central part of the other end section of the second pipe and pulled outside from the other end section of the second pipe without interfering with the assembling device.

3. An assembling device used in the watertightness testing method according to claim 1, the assembling device comprising:
> a frame body attachable to and detachable from the other end section of the second pipe and an attaching section for attaching the pulling device to the frame body, wherein
>
> the attaching section is provided on the frame body, and the frame body can be attached to the other end section of the second pipe to be arranged in a periphery of the passage space for pulling out the moving operation rod.

4. The assembling device according to claim 3, wherein
> the attaching section is provided outside in a pipe diameter direction of the frame body,
>
> a fall prevention device for preventing the frame body attached to the other end section of the second pipe from falling outward in the pipe diameter direction is provided on the frame body, and
>
> the fall prevention device has a rolling element that can be brought into contact with a wall surface surrounding the pipe.

5. The assembling device according to claim 4, wherein the fall prevention device has a position adjuster that moves a position of the rolling element in the pipe diameter direction.

6. An assembly device used in the watertightness testing method according to claim 2, the assembling device comprising:
> a frame body attachable to and detachable from the other end section of the second pipe and an attaching section for attaching the pulling device to the frame body, wherein
>
> the attaching section is provided on the frame body, and the frame body can be attached to the other end section of the second pipe to be arranged in a periphery of the passage space for pulling out the moving operation rod.

7. The assembling device according to claim 6, wherein
> the attaching section is provided outside in a pipe diameter direction of the frame body,
>
> a fall prevention device for preventing the frame body attached to the other end section of the second pipe from falling outward in the pipe diameter direction is provided on the frame body, and
>
> the fall prevention device has a rolling element that can be brought into contact with a wall surface surrounding the pipe.

8. The assembling device according to claim 7, wherein the fall prevention device has a position adjuster that moves a position of the rolling element in the pipe diameter direction.

\* \* \* \* \*